US010618377B2

(12) United States Patent
Nolta et al.

(10) Patent No.: US 10,618,377 B2
(45) Date of Patent: Apr. 14, 2020

(54) INTERNAL GEAR LINKAGE

(71) Applicant: Hanon Systems, Daejeon (KR)

(72) Inventors: James Nolta, Canton, MI (US); Eric Haupt, Livonia, MI (US)

(73) Assignee: HANON SYSTEMS, Daejeon (KR)

( * ) Notice: Subject to any disclaimer, the term of this patent is extended or adjusted under 35 U.S.C. 154(b) by 74 days.

(21) Appl. No.: 15/478,421

(22) Filed: Apr. 4, 2017

(65) Prior Publication Data

US 2018/0281561 A1 Oct. 4, 2018

(51) Int. Cl.
*B60H 1/00* (2006.01)
(52) U.S. Cl.
CPC ..... *B60H 1/00842* (2013.01); *B60H 1/00678* (2013.01); *B60H 1/00857* (2013.01)
(58) Field of Classification Search
CPC .......... B60H 1/00842; B60H 1/00678
USPC ........................................ 454/143
See application file for complete search history.

(56) References Cited

U.S. PATENT DOCUMENTS

| 6,431,266 B1* | 8/2002 | Han | B60H 1/00842 |
| | | | 165/204 |
| 6,453,991 B1* | 9/2002 | Tsurushima | B60H 1/00064 |
| | | | 165/202 |
| 7,658,671 B2* | 2/2010 | Balzo | B60H 1/00671 |
| | | | 137/865 |
| 8,840,452 B2* | 9/2014 | Han | B60H 1/00692 |
| | | | 454/145 |
| 10,272,735 B2* | 4/2019 | Shin | B60H 1/00064 |
| 2005/0142999 A1 | 6/2005 | Uemura | |
| 2007/0184774 A1* | 8/2007 | Balzo | B60H 1/00671 |
| | | | 454/143 |
| 2007/0193716 A1 | 8/2007 | Archibald et al. | |
| 2010/0216386 A1 | 8/2010 | Bruss | |

FOREIGN PATENT DOCUMENTS

| DE | 202006009242 U1 | 8/2006 |
| DE | 102008031610 A1 | 1/2010 |
| EP | 1816016 A1 | 8/2007 |
| JP | 2004058788 A | 2/2004 |
| KR | 20030065689 A | 8/2003 |
| KR | 20100016742 A | 2/2010 |
| KR | 20120138927 A | 12/2012 |
| KR | 20150021720 A | 3/2015 |

* cited by examiner

Primary Examiner — Helena Kosanovic
(74) Attorney, Agent, or Firm — Shumaker, Loop & Kendrick, LLP; James D. Miller

(57) ABSTRACT

An air handling system for a heating, ventilation, and air conditioning system of a motor vehicle having a passenger compartment, includes a main housing having a first mode door rotatably disposed therein and a second mode door rotatably disposed therein. An actuator drives the first mode door. A control mechanism is disposed within the housing and is configured to control a simultaneous rotational position of each of the first mode door and the second mode door.

16 Claims, 4 Drawing Sheets

INTERNAL GEAR LINKAGE

FIELD OF THE INVENTION

The invention relates to a climate control system for a vehicle and more particularly to an internal gear linkage for a climate control system for a heating, ventilating, and air conditioning system for the vehicle.

BACKGROUND OF THE INVENTION

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air-handling system. The air-handling system conditions air flowing therethrough and distributes the conditioned air throughout the passenger compartment.

The air-handling system commonly employs a housing having a plurality of passageways and doors for controlling a temperature and a flow of the air therethrough. The housing may for example be divided into an inlet section, a conditioning section, a mixing section, and a delivery section. The inlet section may include a blower or fan for delivering the air to the conditioning section. The conditioning section includes one or more heat exchangers for controlling a temperature and humidity of the air. Control features disposed within the conditioning section control the flow of the air through passageways having the heat exchangers disposed therein. For example, temperature doors, or otherwise referred to as flaps or valves, can be employed to control the flow of the air through passageways having the heat exchangers disposed therein. The mixing section is disposed downstream of the conditioning section and forms a chamber for recombining each of the streams of air, whether heated or cooled, exiting the conditioning section. The delivery section includes a plurality of conduits or ducts branching from the mixing section for delivering the air to desired vents located within the passenger compartment of the vehicle.

Generally, the air-handling system is adapted to control the air distributed to at least three zones of the passenger compartment. For example, the first zone may be a front driver side, the second zone may be a passenger driver side, and the third zone may be a rear occupant zone. The vents disposed within the passenger compartment may include panel vents, defrost vents, and front floor vents disposed in each of the first zone and the second zone. Additionally, the vents may include rear console and rear floor vents disposed in the third zone, for example. The delivery section is configured to deliver the air originating from the mixing section to any combination of the vents based on the operating mode selected by a passenger of the vehicle. Each operating mode includes a preselected percentage (or distribution ratio) of the air originating from the mixing section delivered to each of the corresponding vents associated with the selected operating mode. Doors disposed within the delivery section may be actuated to control the distribution of the air to each of the desired vents by blocking or opening various passageways disposed within the delivery section. For example, a "panel operating mode" may include the air distributed only to the panel vents and the rear console vents, a "defrost operating mode" may include the air distributed only to the defrost vents, and a "floor operating mode" may include the air distributed to each of the front floor vents, the rear floor vents, the windshield defrost vents, and the side window defrost vents. Other modes in which air is distributed among to other combination of the vents are also employed in many vehicles such as a "bi-level mode" or "mix mode."

In certain vehicles, the doors disposed within the delivery section to control the distribution of the air to the vents in the first zone and second zone, for example, extend along a width of the housing from or proximate to a first side of the housing to or proximate to a second opposing side of the housing. These doors are controlled with a single actuator and kinematics system positioned externally to the housing at either the first side or second side of the housing. However, depending on the air handling system package requirements, vehicle space requirements, and sizing and configuration of the housing, a smaller door or auxiliary door may be required for controlling the distribution of air to the third zone. The smaller door is disposed at a distance from the first side and the second side of the housing respectively, and in certain applications may be centrally positioned with respect to the width of the housing and/or the doors providing distribution to the first zone and the second zone. Therefore, in known systems, the smaller door is not as easily and cost effectively mechanically linked to the single actuator and kinematics system.

For example, in order to mechanically link the smaller door to the single actuator and kinematics systems, some know systems use an external configuration which requires additional components to and enhancing the dimensions of the single actuator and kinematics systems included externally to the housing. Additional components needed to accommodate the smaller door or auxiliary door may be gear wheels, shafts, couplings, and larger housings for example. The additional components are costly and enhance the dimensions of the single actuator and kinematics system, add manufacturing and assembly complexity, and may not be feasible for achieving certain package and space requirements.

In order to avoid the complexity and infeasibility of the external configuration, an internal configuration is typically utilized within the housing. However, the internal configuration is not always feasible due to package and size requirements. If package and size requirements permit the utilization of the internal configuration, the internal configuration requires many components. These components occupy desired interior air flow cross-sectional areas which minimizes the performance of the air-handling system and complicate assembly of the air-handling system.

Furthermore, the position of the smaller door may depend on the position of the other doors. Therefore, there is a desire for increased precision between control of the positions of the doors relative to each other. The known external configurations and internal configurations may not provide the precision required which results in mechanical hysteresis between the doors and minimizes the desired performance of the air-handling system.

Accordingly, there exists a need in the art to simply, efficiently, and simultaneously control two or more doors of an air-handling system in a low cost manner, while maintaining desired package size requirements.

SUMMARY OF THE INVENTION

Concordant and consistent with the present invention, apparatus for simply, efficiently, and simultaneously controlling two or more doors of an air-handling system in a low cost manner, while maintaining desired package size requirements has surprisingly been discovered.

In one embodiment of the invention, an air handling system for a heating, ventilation, and air conditioning system of a motor vehicle having a passenger compartment is disclosed. An air handling system for a heating, ventilation, and air conditioning system of a motor vehicle having a passenger compartment, includes a main housing having a first mode door rotatably disposed therein and a second mode door rotatably disposed therein. An actuator drives the first mode door. A control mechanism is disposed within the housing and is configured to control a simultaneous rotational position of the second mode door with respect to the first mode door.

In another embodiment of the invention, an air handling system for a heating, ventilation, and air conditioning system of a motor vehicle having a passenger compartment is disclosed. The air handling system includes a main housing divided into a first chamber, a second chamber, and a third chamber, the main housing including a first mode door rotatably disposed therein extending within the first chamber and the second chamber, and a second mode door rotatably disposed therein extending within the third chamber. An actuator drives the first mode door. A control mechanism is disposed within the main housing and is configured to control a simultaneous rotational position of the second mode door in respect of the first mode door.

In yet another embodiment, an air handling system for a heating, ventilation, and air conditioning system of a motor vehicle having a passenger compartment is disclosed. The air handling system includes a main housing divided into a first chamber, a second chamber, and a third chamber, the main housing including a first mode door rotatably disposed therein extending within the first chamber and the second chamber, and a second mode door rotatably disposed therein extending within the third chamber. The first mode door has a gear link formed thereon and the second mode door has a second gear link formed thereon. An actuator drives the first mode door. A control mechanism is disposed within the main housing and provides simultaneous rotational communication between the first mode door and the second mode door. The control mechanism is coupled to a clip feature extending outwardly from an internal surface of the main housing.

BRIEF DESCRIPTION OF THE DRAWINGS

The above, as well as other advantages of the present disclosure, will become readily apparent to those skilled in the art from the following detailed description, particularly when considered in the light of the drawings described hereinafter.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
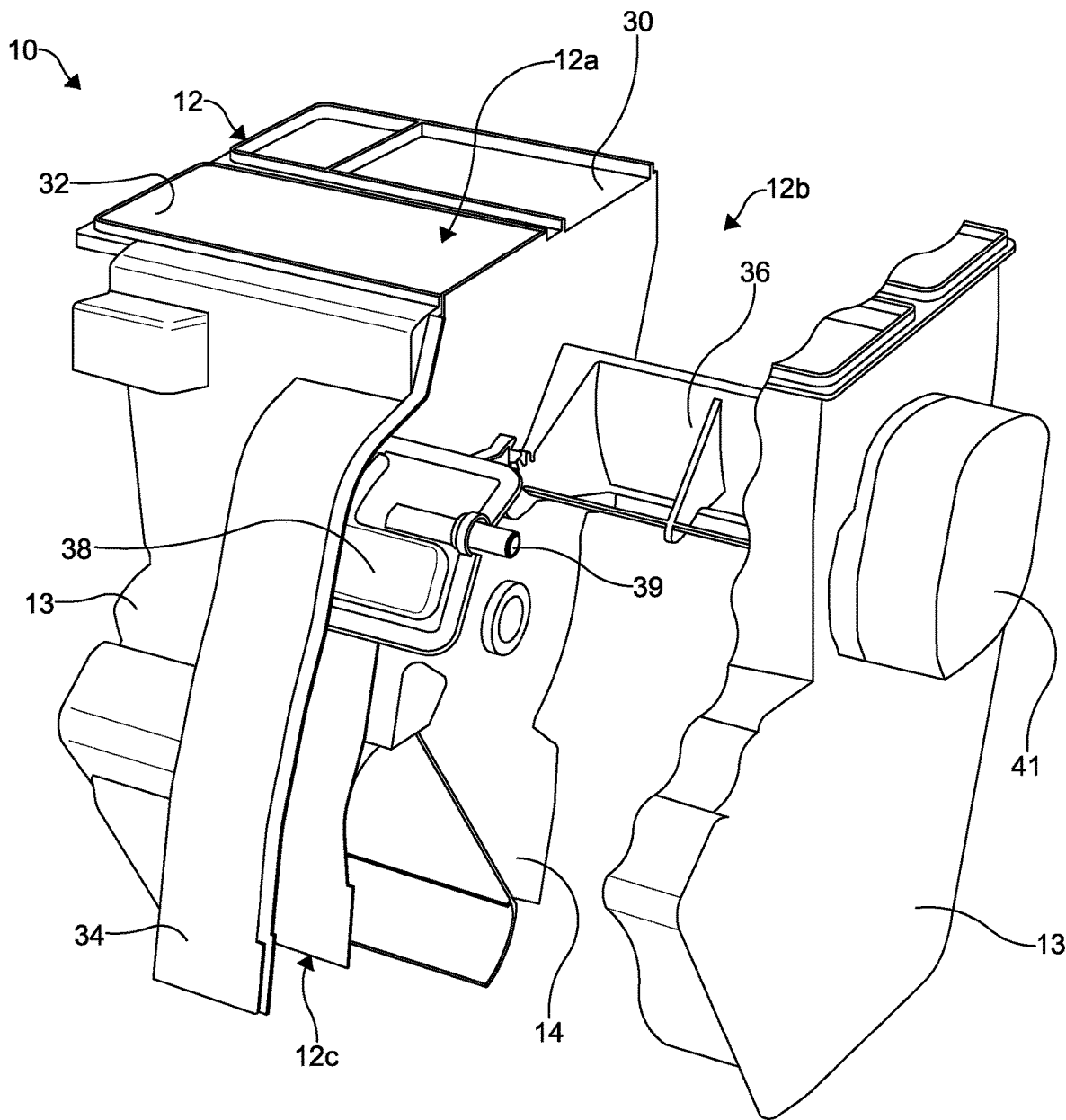
FIG. 1 is a partially exploded fragmentary perspective view of the air handling system including a control mechanism according to an embodiment of the invention.
Figure 2:
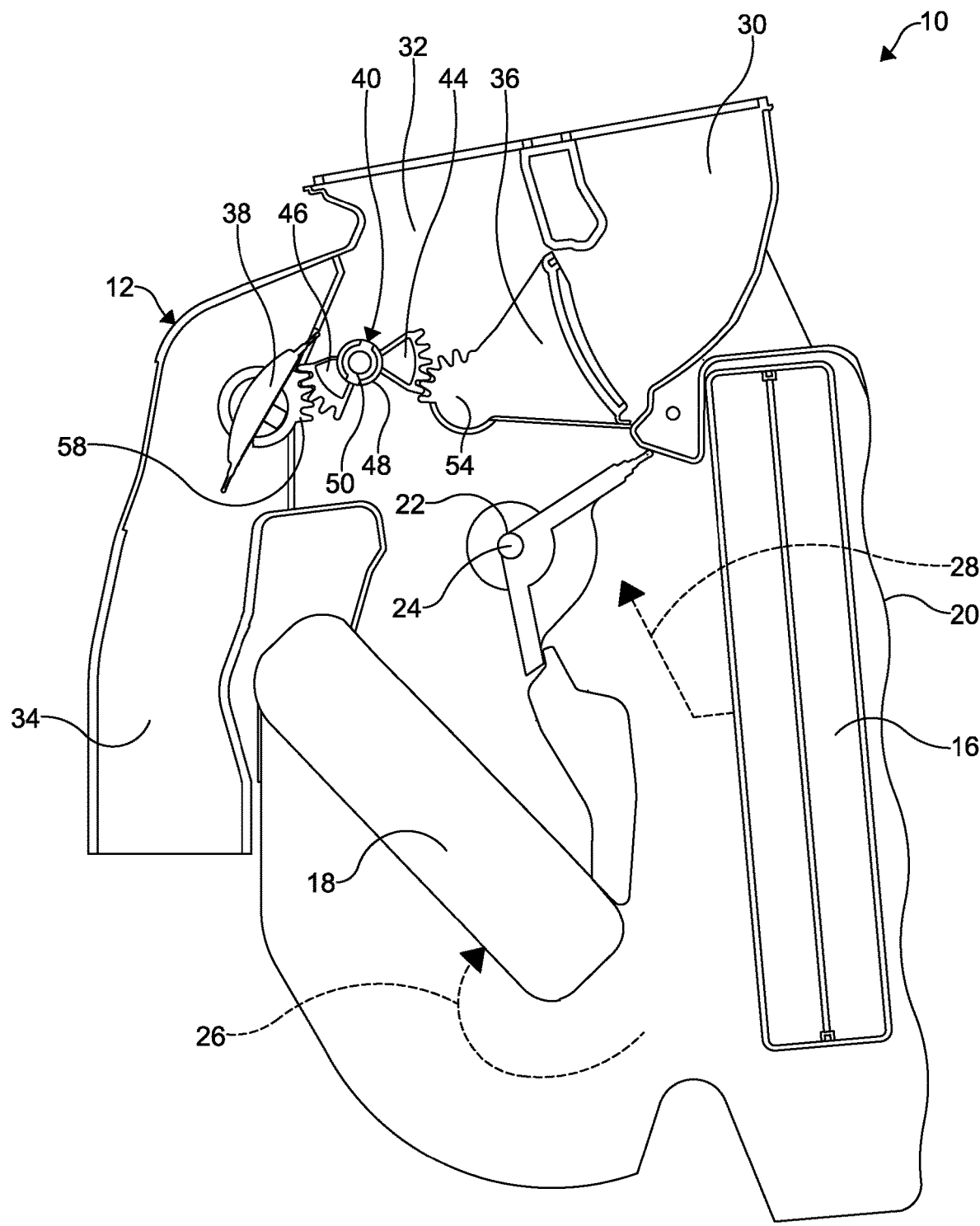
FIG. 2 is an elevational view showing an interior of a main housing of an air handling system of FIG. 1.

FIGS. 1-2 illustrate an air-handling system 10 of a heating, ventilating, and air conditioning (HVAC) system for a vehicle (not shown) according to an embodiment of the disclosure. The air-handling system 10 illustrated in FIG. 1 has components removed for illustration purposes only. It is understood the air-handling system of FIG. 1 may include additional features such as shown in FIG. 2 and features commonly employed with air-handling systems. As used herein, the term air can refer to fluid in a gaseous state, fluid in a liquid state, or any combination thereof. The air-handling system 10 typically provides heating, ventilation, and air conditioning for a passenger compartment (not shown) of the vehicle.

The air-handling system 10 includes a hollow main housing 12. The main housing 12 may be formed by the cooperation of a pair of housing shells 13. In the embodiment shown, the housing shells 13 interface with each other along peripheral regions thereof to form the hollow main housing 12. The housing shells 13 may be formed from plastic, but other materials can be used, as desired. In other embodiments, the main housing 12 may be formed by the cooperation of three or more separately formed components or housing portions, as desired. The main housing 12 is configured to distribute air through vents (not shown) to a first zone, a second zone, and a third zone of the passenger compartment (not shown) of the vehicle. For example, the first zone may be a front driver side zone of the passenger compartment of the vehicle, the second zone may be a front passenger side zone of the passenger compartment of the vehicle, and the third zone may be a rear occupant zone of the passenger compartment of the vehicle. However, it is understood the main housing 12 can be configured to distribute air through vents to more than or fewer than three zones of the passenger compartment of the vehicle. Additionally, it is understood the zones can correspond to alternate zones of the passenger compartment, as desired.

In the embodiment illustrated, the main housing 12 defines a plurality of chambers 12a, 12b, 12c such as a first chamber 12a, a second chamber 12b, and a third chamber 12c. For example, the first chamber 12a is configured to distribute air through the vents to the first zone, the second chamber 12b is configured to distribute air to the second zone of the passenger compartment, and the third chamber 12c is configured to distribute air through the vents to the third zone of the passenger compartment, for example. In the embodiment illustrated, a divider 14 divides the first chamber 12a from the second chamber 12b. The third chamber 12c is formed in the main housing 12, wherein a first portion thereof is continuous with the first chamber 12a and a second portion thereof is continuous with the second chamber 12b and is disposed intermediate a first side and a second side of the main housing 12 defining the first chamber 12a and the second chamber 12b. However, it is understood the third chamber 12c could be completely continuous with either the first chamber 12a or the second chamber 12b, but not both. Additionally, the third chamber can be separate from and non-continuous with both the first chamber 12a and second chamber 12c, if desired.

FIG. 2 illustrates a hollow interior of the main housing 12 with one of the two housing shells 13 cooperating to form the main housing 12 removed to better illustrate the components included in the main housing 12. The main housing 12 includes an inlet 20. The inlet 20 is in fluid communication with a supply of air. The supply of air can be provided from outside of the vehicle, recirculated from the passenger compartment of the vehicle, or a mixture of the two, for example. The inlet 20 may be formed adjacent a blower or fan (not shown) configured to promote a flow of the supply of air through the inlet 20 and through the main housing 12.

The main housing 12 may include an evaporator core 16 and a heater core 18. The evaporator core 16 is configured to exchange heat energy between the flow of air and the refrigerant flowing through the evaporator core 16 to cool and/or dehumidify the flow of air. Although described as an evaporator core, it should be understood that any form of cooling device in heat exchange relationship with any device or system of the motor vehicle may be employed for use with the air handling system 10 without departing from the scope of the present invention. The heater core 18 is configured to exchange heat energy between the flow of air and a coolant circulated through the heater core 18 to heat the flow of air. It should be understood that any form of heating device suitable for heating a flow of air therethrough may be used in place of the heater core 18 without departing from the scope of the present invention.

A temperature door 22 is rotatably coupled to the main housing 12 downstream the evaporator core 16 and the heater core 18. The temperature door 22 is disposed on a temperature door shaft 24 that is rotatably disposed in the main housing 12. The temperature door 22 may be positioned in a first position wherein the temperature door 22 is rotated to block passage of the flow of air through a warm air passageway 26 through the heater core 18. When the temperature door 22 is in the first position the entirety of the flow of air is directed through an opened cold air passageway 28 through the evaporator core 16. The temperature door 22 may alternatively be positioned in a second position wherein the temperature door 22 is rotated to block passage of the flow of air through the cold air passageway 28. When the temperature door 22 is in the second position the entirety of the flow of air is directed through the opened warm air passageway 26.

The temperature door 22 may alternatively be rotated to an intermediate position between the first position and the second position. When in the intermediate position, a first partial air flow of the flow of air may flow through the cold air passageway 28, past the temperature door 22, while a second partial air flow of the flow of air may flow through the warm air passageway 26 including the heater core 18, past the temperature door 22. The first partial air flow and the second partial air flow are then recombined and mixed in a mixing section past the temperature door 22. As should be understood, the temperature door 22 may be adjustable to a variety of intermediate positions to control a percentage of the flow of air passing through the cold air passageway 28 and the warm air passageway 26, respectively, to control a temperature of the flow of air according to desired settings of a passenger within the passenger compartment of the motor vehicle. Further components and other strategies for controlling the flow of air and controlling the temperature of the air flowing to the passenger compartment can be contemplated, if desired.

The main housing 12 includes a first conduit 30, a second conduit 32, and a third conduit 34. In certain exemplary embodiments, the first conduit 30 may be a conduit for directing the flow of air towards a windshield or side window defrost vents of the first zone and second zone of passenger compartment. The second conduit 32 may be a conduit for directing the flow of air towards one or more console or panel vents of the first zone and the second zone of the passenger compartment. The first conduit 30 and the second conduit 32 may be divided by the divider 14 to control flow to the respective zones. The third conduit 34 may be a conduit for directing the flow of air towards rear console or floor vents of the third zone of the passenger compartment. However, the first conduit 30, the second conduit 32, and the third conduit 34 may direct the flow of air to any different regions or vents of the air handling system 10 without departing from the scope of the present invention.

A first mode door 36 is rotatably coupled to the main housing 12 downstream from the temperature door 22 adjacent an inlet of the first conduit 30 and an inlet of the second conduit 32. The first mode door 36 is disposed on a first mode door shaft 37 that is rotatbly disposed in the main housing 12. The first mode door 36 may be positioned in a first position wherein the first mode door 36 is rotated to block passage of the flow of air into the first conduit 30. When in the first position, the entirety of the flow of air is caused to flow through the second conduit 32. The first mode door 36 may alternatively be positioned in a second position wherein the first mode door 36 is rotated to block passage of the flow of air into the second conduit 32. When in the second position the entirety of the flow of air is caused to flow through the first conduit 30.

The first mode door 36 may alternatively be rotated to an intermediate position between the first position and the second position. When in the intermediate position, a first partial air flow of the flow of air flows through the first conduit 30 while a second partial air flow of the flow of air flows through the second conduit 32. As should be understood, the mode door 32 may be adjusted to a variety of intermediate positions to control a percentage of the flow of air directed to each of the first conduit 30 and the second conduit 32 to control a venting of the flow of air into the passenger compartment of the motor vehicle.

A second mode door 38 is rotatably coupled to the main housing 12 downstream from the temperature door 22 adjacent an inlet to the third conduit 34. The second mode door 38 is disposed on a second mode door shaft 39 that is rotatably disposed in the main housing 12. The second mode door 38 may be positioned in a first position wherein the second mode door 38 is rotated to block passage of the flow of air into the third conduit 34. The second mode door 38 may alternatively be positioned in a second position wherein the second mode door 38 is rotated to permit passage of the flow of air into the third conduit 34. The first mode door 36 may alternatively be rotated to an intermediate position between the first position and the second position of the first mode door 36. It is understood, additional conduits, doors, dividers, and other control features can be included in the main housing 12 to control the flow of air through the main housing 12 and to the passenger compartment of the vehicle, as desired. Additionally, alternate arrangements and configurations of the conduits, doors, dividers, and other control features can also be contemplated without departing from the scope of the instant disclosure.

Figure 3:
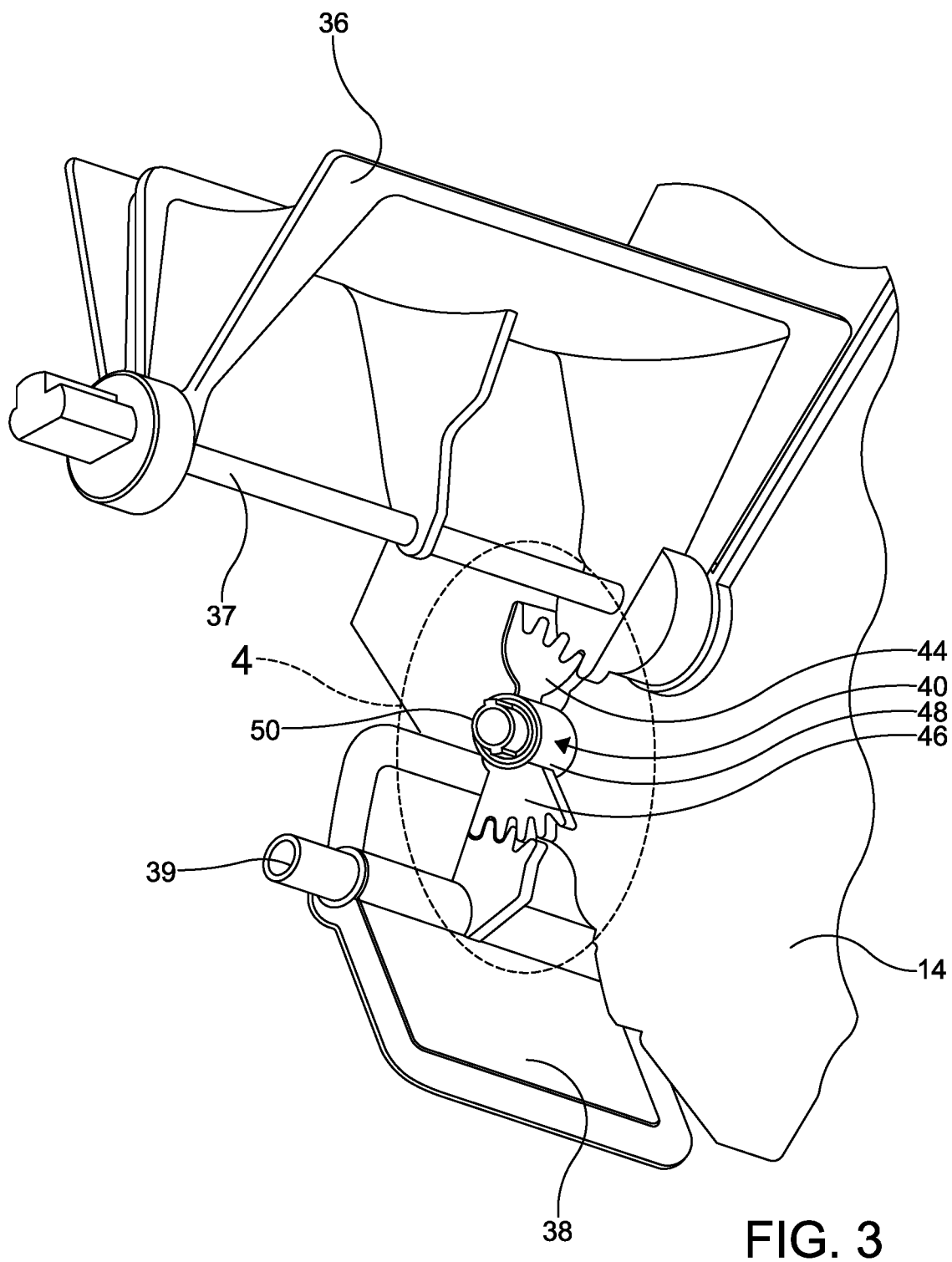
FIG. 3 is a fragmentary bottom perspective view of a first mode door, a second mode door, and a control mechanism cooperating with a divider of the air handling system of FIGS. 1-2.
Figure 4:
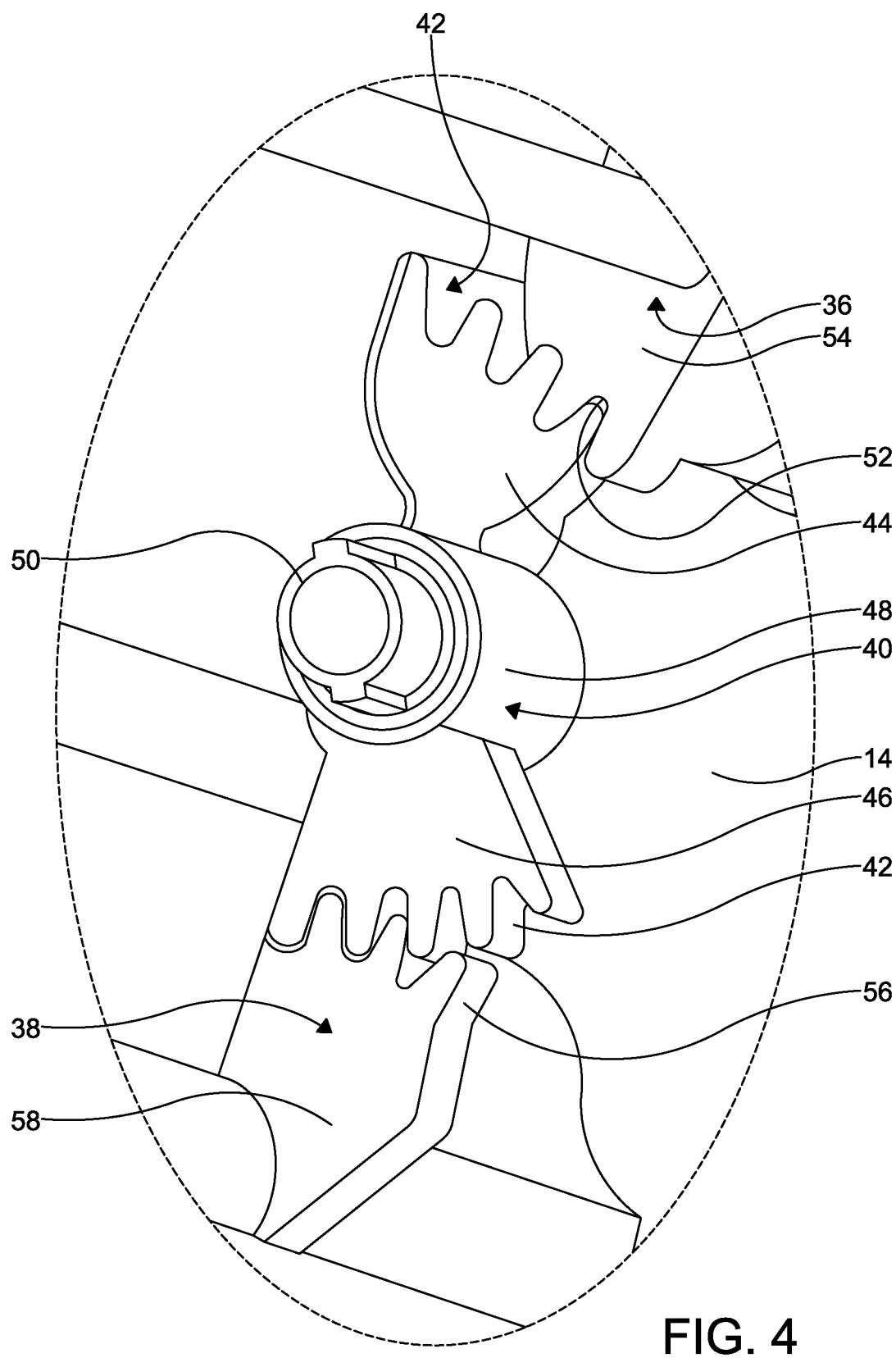
FIG. 4 is an enlarged fragmentary bottom perspective view of the control mechanism of FIG. 3, highlighted by circle 4 of FIG. 3.

As illustrated in FIGS. 1 and 3-4, the second mode door 38 has a length less than a length of the first mode door 36 to accommodate a width of the third conduit 34, wherein the width of the third conduit 34 is less than a width of the main housing 12 defining the first chamber 12a and the second chamber 12b and including the first mode door 36. In the embodiment illustrated, the second mode door 38 is disposed adjacent an edge of the divider 14 and simultaneously controls the flow of air from the first chamber 12a into the third chamber 12c or third conduit 34 and the flow of air from the second chamber 12b into the third chamber 12c or third conduit 34.

With reference to FIGS. 1-4, the air handling system 10 includes a control mechanism 40 configured to provide simultaneous control of each of the first mode door 36 and the second mode door 38 while being driven by a single actuator 41. The control mechanism 40 is a mode link gear. As used herein, the term "gear" may refer to any component including a feature for engaging and transferring a rotational motion of the rotating component to another distinct component. In certain embodiments, the control mechanism 40 is a single component having a first portion 44 and a second portion 46. The control mechanism 40 has engaging features 42, such as teeth, formed thereon. The engaging features 42 are formed at a first end of the control mechanism 40 in the first portion 44 and at a second end of the control mechanism 40 in the second portion 46. The engaging features 42 facilitate transferring the rotational motion between the first mode door 36 and the second mode door 38. A rotatable portion 48 is disposed intermediate the first portion 44 and the second portion 46 to allow the control mechanism 40 to rotate thereabout. The rotatable portion 48 is configured as a ring. It is understood the control mechanism 40 can include more than one component, and each component can include more than the three portions.

The control mechanism 40 is configured to be mounted to an internal surface of the main housing 12 and more specifically to a surface of the divider 14. However, the control mechanism 40 can be mounted to an inside wall of the housing shells 13, if desired. The control mechanism 40 may be mounted to the divider 14 using any known method or coupling device. In some embodiments, the rotable portion 48 aligns with, receives, and engages a clip feature 50 formed on and outwardly extending from the divider 14. The clip feature 50 and the rotatable portion 48 cooperate to retain the control mechanism 40 in engagement with the divider 14 and to allow rotation of the control mechanism 40 about the rotatable portion 48.

The first mode door 36 is rotatably coupled to the actuator 41 by the first mode door shaft 37. The engagement features 42 of the first portion 44 engage teeth 52 of a gear link 54 integrally formed with the first mode door 36. The first mode door 36 transfers rotational movement from the actuator 41 to the control mechanism 40. The engagement features 42 of the second portion 46 engage teeth 56 of a gear link 58 integrally formed with the second mode door 38 to transfer rotational movement of the control mechanism 40 from the first mode door 36 causing the second mode door 38 to rotate between the first position and the second position thereof. The gear links 54, 58 are formed with the respective mode doors 36, 38 during a molding process forming the doors 36, 38. However, it is understood, the gear links 54, 58 can also be separately formed from the respective mode doors 36, 38 and coupled thereto or can be formed by any other manufacturing process, if desired.

In the embodiments illustrated, the control mechanism 40 is a single component coupled to one surface of the divider 14 employed to rotationally mechanically link the first mode door 36 to the second mode door 38. As a result, only one gear link 54, 58 is formed with the respective mode doors 36, 38. However, in other embodiments, more than one component of the control mechanism 40 can be employed. For example, the control mechanism 40 can include two separate components disposed on opposing surfaces of the divider 14, wherein each of the components of control mechanisms 40 engage one of two gear links 54, 58 formed with each of the respective mode doors 36, 38. Additionally, a series of sequential mechanically linked components of the control mechanisms 40 can be employed between the first mode door 36 and the second mode 38 if desired. For example, the first mode door 36 may transfer rotational movement to a first component of the control mechanism 40 in rotational communication with a second component of the control mechanism 40. The second component of the control mechanism 40 can then be engaged with the second mode door 38 to provide a transfer of rotational rotation to the second mode door 38. More than two components of the control mechanism 40 can be provided, if desired. As shown, the gear links 54, 58 are formed on a position of the respective mode doors 36, 38 correlating to a position aligning with the control mechanism 40, which in the embodiment illustrated, is proximate a central portion of the respective mode doors 36, 38. However, depending on a position of control mechanism 40 on an inner surface of the main housing 12, a position of the mode doors 36, 38, and the structural arrangement and number of components of the control mechanism 40, it is understood the gear links 54, 58 can be formed at any position on the mode doors 36, 38.

As illustrated, the first portion 44 of the control mechanism 40 has a cross-sectional shape corresponding to a sector of a circle, wherein the engaging features 42 are formed in a circumferential surface thereof. The second portion 46 of the control mechanism 40 has a cross-sectional shape corresponding to a sector of a circle, wherein the engaging features 42 are formed in a circumferential surface thereof. However, the portions 44, 46 of the control mechanism 40 can have any cross-sectional shape as desired such as substantially circular or ovular for example. It is understood, the first portion and the second portion can have different shapes and/or sizes. For example, the first portion 44 can have a radius equal to or different from a radius of the second portion 46, depending on the configuration of the mode doors 36, 38 and housing 12.

The actuator 41 may be any known actuator capable of producing and transferring torque to the first mode door 36. The actuator 41 may be mechanically operated, electrically operated, fluid operated, or otherwise operated, for example. The actuator 41 may be an electronic motor driven rotary actuator, as a non-limiting example, or any mechanism consisting of gears, links, cams, levers, and any other kinematic-type components, as another non-limiting example. The actuator 41 is coupled adjacent an outer surface of the main housing 12 at a portion of the main housing 12 corresponding to the first mode door 36. The actuator 41 engages the shaft 37 of the first mode door 36 and causes the first mode door 36 to rotate between the first position and the second position thereof. The actuator 41 may also impart rotational movement of other doors included in the main housing 12, if desired.

The single actuator 41 and the control mechanism 40 cooperate to simultaneously control a rotational position of each of the first mode door 36 and the second mode door 38. The actuator 41 causes the first mode door 36 to rotate between the first position and the second position thereof. In the first position, the first mode door 36 blocks the flow of air through the first conduit 30 and permits the air to flow through the second conduit 32. As the first mode door 36 rotates to the first position thereof, the first mode door 36 transmits rotational movement to the second mode door 38 through the control mechanism 40 to cause the second mode door 38 to simultaneously rotate to the second position thereof. In the second position of the second mode door 38, the flow of air also flows through the third conduit 34. As the first mode door 36 rotates to the second position thereof, the first mode door 36 transmits rotational movement to the second mode door 38 through the control mechanism 40 to cause the second mode door 38 to simultaneously rotate to the first position thereof. In the first position of the second mode door 38, the flow of air is closed to the second conduit 32 and the third conduit 34 and an entirety of the flow of air is conveyed through the first conduit 30. The actuator 41 can also cause the first mode door 36 to be positioned intermediate the first position and the second position thereof. In an intermediate position of the first mode door 36, the second mode door 38 is caused to be positioned intermediate the first position and the second position thereof. In the intermediate position of the second mode door 38 and the first mode door 36, a partial air flow of the flow of air is divided to flow through each of the first conduit 30, the second conduit 32, and the third conduit 34.

In another embodiment of the invention, the control mechanism 40 can be a combination of the gear links 54, 58 of the mode doors 36, 38 directly engaging and cooperating with each other to transfer torque between the mode doors 36, 38 without a separate control mechanism component therebetween. It should be appreciated, whether the gear link 54 of the first mode door 36 directly engages and cooperates with the gear link 58 of the second mode 38 door depends on a configuration of the mode doors 36, 38, a distance between the mode doors 36, 38, and any other space requirements within the housing 12. The control mechanism 40 can also be a series of links, cams, gears, and other kinematic-type components configured to mechanically link the mode doors 36, 38 or any other door within the housing 12.

It should be appreciated by one skilled in the art that the general principles of operation of the control mechanism 40 may be adapted for use with a variety of different control mechanisms having substantially similar components but different sizes, packaging arrangements, and configurations. It should also be appreciated by one skilled in the art that the general concepts relating to the control mechanism 40 may be applied to the control of any variety of different rotational components disposed within the main housing 12.

Advantageously, the control mechanism 40 permits the second mode door 38 to rotate simultaneously with the first mode door 36. As a result, the actuator 41, which is positioned outside of the main housing 12, can be limited in size and accommodate package size requirements of the air handling system 10. The actuator 41 does not take up undesired space and is only required to control the first mode door 36 and any other doors proximate to the first mode door 36 and not required to extend to couple to the second mode door 38. With the control mechanism 40, an accuracy is maintained and costs and manufacturing complexity are minimized. As a result of the control mechanism 40 configured in such a manner described herein and coupled to the inner surface of the main housing 12 such as the divider 14, the flow of air through the main housing 12 is minimally restricted. The control mechanism 40 can be employed to connect any of the doors included within the main housing 12 to control the flow of air flowing through the main housing 12.

It should further be appreciated by one skilled in the art that the control mechanism 40 may be further adapted to concurrently control the rotational positions of three or more rotational components disposed within the main housing 12. Accordingly, each additional door in need of rotation requires a gear link engaging a control mechanism. This process may be repeated as many times as needed to provide concurrent control to as many doors disposed within the main housing 12 as desired to produce each desired operational mode of the air handling system 10. The term "mode door" used throughout the application broadly refers to any door used in the handling system 10 and should not be limited to doors only disposed in the conduits of the air handling system 10. For example, doors disposed in a mixing and conditioning section, such as the temperature door 22 described hereinabove, at inlets to the air handling system 10, or any other doors disposed within the housing 12 to control temperature and the flow of air through the housing 12 can be contemplated as "mode doors".

Accordingly, from the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air handling system for a heating, ventilation, and air conditioning system of a motor vehicle having a passenger compartment, the air handling system comprising:

a main housing having a first mode door rotatably disposed therein and a second mode door rotatably disposed therein, an axis of rotation of the first mode door and an axis of rotation of the second mode door each extending in a lateral direction of the main housing, the main housing including a first chamber, a second chamber, and a third chamber, a divider of the main housing separating the first chamber from the second chamber with respect to the lateral direction of the main housing, the third chamber positioned in the lateral direction of the main housing to be continuous with the first chamber and the second chamber, wherein the first mode door is rotatably disposed within each of the first chamber and the second chamber, and wherein the second mode door is rotatably disposed within the third chamber;

an actuator operating the first mode door; and a control mechanism disposed within the main housing and configured to control a simultaneous rotational position of each of the first mode door and the second mode door, wherein the control mechanism is a single component having a first portion, a second portion, and a rotatable portion about which the control mechanism rotates disposed intermediate the first portion and the second portion, wherein each of the first portion and the second portion has a cross-sectional shape substantially corresponding to a sector of a circle having a central angle of less than 180 degrees wherein a teeth are placed on the first and the second portion only.

2. The air handling system of claim 1, wherein the control mechanism is rotatably coupled to an inner surface of the main housing.

3. The air handling system of claim 1, wherein the first mode door is spaced from the second mode door, the actuator directly connected to only the first mode door.

4. The air handling system of claim 1, wherein the first portion of the control mechanism directly engages the first mode door and the second portion of the control mechanism directly engages the second mode door.

5. The air handling system of claim 1, wherein the teeth of the first portion of the control mechanism are formed in an outer circumferential surface thereof, the teeth of the first portion engaging the first mode door, and wherein the teeth of the second portion of the control mechanism are formed in an outer circumferential surface thereof, the teeth of the second portion engaging the second mode door.

6. The air handling system of claim 5, wherein the first mode door has a gear link having teeth formed thereon, the teeth of the first mode door engaging the teeth formed in the outer circumferential surface of the first portion of the control mechanism, wherein the second mode door has a gear link having teeth formed thereon, the teeth of the second mode door engaging the teeth formed in the outer circumferential surface of the second portion of the control mechanism.

7. The air handling system of claim 6, wherein the gear link of the first mode door is integrally formed with the first mode door and the gear link of the second mode door is integrally formed with the second mode door.

8. The air handling system of claim 1, wherein the rotatable portion is configured as a ring.

9. The air handling system of claim 1, wherein the control mechanism is rotatably coupled to the divider.

10. The air handling system of claim 1, wherein the divider includes a clip feature coupling the control mechanism to the divider.

11. The air handling system of claim 1, wherein the control mechanism includes a series of gears providing rotational communication between the first mode door and the second mode door.

12. An air handling system for a heating, ventilation, and air conditioning system of a motor vehicle having a passenger compartment, the air handling system comprising:
a main housing divided into a first chamber, a second chamber, and a third chamber, the main housing including a first mode door rotatably disposed therein extending within the first chamber and the second chamber, and a second mode door rotatably disposed therein extending within the third chamber, an axis of rotation of the first mode door and an axis of rotation of the second mode door each extending in a lateral direction of the main housing, a divider of the main housing separating the first chamber from the second chamber with respect to the lateral direction of the main housing, the third chamber positioned in the lateral direction of the main housing to be continuous with the first chamber and the second chamber;
an actuator operating the first mode door; and
a control mechanism disposed within the main housing and configured to control a simultaneous rotational position of each of the first mode door and the second mode door, wherein the control mechanism is a single component having a first portion, a second portion, and a rotatable portion about which the control mechanism rotates disposed intermediate the first portion and the second portion, wherein each of the first portion and the second portion has a cross-sectional shape substantially corresponding to a sector of a circle having a central angle of less than 180 degrees wherein a teeth are placed on the first and the second portion only.

13. The air handling system of claim 12, wherein the control mechanism is coupled to the divider.

14. The air handling system of claim 13, wherein the control mechanism is coupled to a clip feature extending outwardly from a surface of the divider.

15. The air handling system of claim 14, wherein the clip feature is integrally formed with the divider.

16. An air handling system for a heating, ventilation, and air conditioning system of a motor vehicle having a passenger compartment, the air handling system comprising:
a main housing divided into a first chamber, a second chamber, and a third chamber, the main housing including a first mode door rotatably disposed therein extending within the first chamber and the second chamber, and a second mode door rotatably disposed therein extending within the third chamber, the first mode door having a gear link formed thereon and the second mode door having a second gear link formed thereon, an axis of rotation of the first mode door and an axis of rotation of the second mode door each extending in a lateral direction of the main housing, a divider of the main housing separating the first chamber from the second chamber with respect to the lateral direction of the main housing, the third chamber positioned in the lateral direction of the main housing to be continuous with the first chamber and the second chamber;
an actuator operating the first mode door; and
a control mechanism disposed within the main housing and cooperating with the gear link of the first mode door and the gear link of the second mode door to provide simultaneous rotational communication between the first mode door and the second mode door, the control mechanism coupled to a clip feature extending outwardly from an internal surface of the main housing, wherein the control mechanism is a single component having a first portion, a second portion, and a rotatable portion about which the control mechanism rotates disposed intermediate the first portion and the second portion, wherein each of the first portion and the second portion has a cross-sectional shape substantially corresponding to a sector of a circle having a central angle of less than 180 degrees wherein a teeth are placed on the first and the second portion only.

* * * * *